United States Patent
Miyagawa et al.

(10) Patent No.: US 12,423,331 B2
(45) Date of Patent: Sep. 23, 2025

(54) CLASSIFICATION APPARATUS, CLASSIFICATION METHOD, AND RECORDING MEDIUM

(71) Applicant: NEC Corporation, Tokyo (JP)

(72) Inventors: Taiki Miyagawa, Tokyo (JP); Akinori Ebihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/708,262

(22) PCT Filed: Nov. 17, 2021

(86) PCT No.: PCT/JP2021/042149
§ 371 (c)(1),
(2) Date: May 8, 2024

(87) PCT Pub. No.: WO2023/089678
PCT Pub. Date: May 25, 2023

(65) Prior Publication Data
US 2025/0005045 A1    Jan. 2, 2025

(51) Int. Cl.
*G06F 16/00* (2019.01)
*G06F 16/28* (2019.01)

(52) U.S. Cl.
CPC ................... *G06F 16/285* (2019.01)

(58) Field of Classification Search
CPC ..................................................... G06F 16/285
USPC ....................................................... 707/737
See application file for complete search history.

(56) References Cited

U.S. PATENT DOCUMENTS

| 2004/0007823 | A1 | 1/2004 | Brauer et al. |
| 2004/0078232 | A1 | 1/2004 | Brauer et al. |
| 2016/0321257 | A1* | 11/2016 | Chen ............ G06F 16/783 707/707 |

FOREIGN PATENT DOCUMENTS

| CN | 112926016 A | 6/2021 |
| JP | 2010-537585 A | 12/2010 |
| JP | 2014-134987 A | 7/2014 |
| JP | 2019-003585 | 1/2019 |
| JP | 2020-104839 A | 7/2020 |
| KR | 2019-0023389 A | 3/2019 |
| WO | 2007/029455 A1 | 3/2007 |

OTHER PUBLICATIONS

International Search Report for PCT Application No. PCT/JP2021/042149, mailed on Feb. 8, 2022.

Shou, Zheng, Dongang Wang, and Shih-Fu Chang, "Temporal action localization in untrimmed videos via multi-stage cnns", Proceedings of the IEEE conference on computer vision and pattern recognition. 2016.

(Continued)

*Primary Examiner* — Alexandria Y Bromell

(57) ABSTRACT

In order to suitably perform labeling even in a case where there is an unclear event boundary, a classification apparatus (1) includes: an acquiring means (11) for acquiring series data; and a class label assigning means (12) for assigning a class label to each piece of element data contained in the series data, by repeatedly applying quickest change detection to the series data.

18 Claims, 7 Drawing Sheets

(56) References Cited

OTHER PUBLICATIONS

G. Rovatsos, X. Jiang, A. D. Dominguez-Garcia and V. V. Veeravalli, "Statistical Power System Line Outage Detection Under Transient Dynamics", in IEEE Transactions on Signal Processing, vol. 65, No. 11, pp. 2787-2797, Jun. 1, 2017, doi: 10.1109/TSP.2017.2673802.
Akinori F. Ebihara et. al., "Sequential Density Ratio Estimation for Simultaneous Optimization of Speed and Accuracy", Published as a conference paper at ICLR 2021, https://openreview.net/forum?id=Rhsu5qD36cL.
Taiki Miyagawa et. al., "The Power of Log-Sum-Exp: Sequential Density Ratio Matrix Estimation for Speed-Accuracy Optimization", Proceedings of the 38th International Conference on Machine Learning, 2021, https://proceedings.mlr.press/v139/miyagawa21a.html.
JP Office Action for JP Application No. 2023-561968, mailed on Jul. 8, 2025 with English Translation.

* cited by examiner

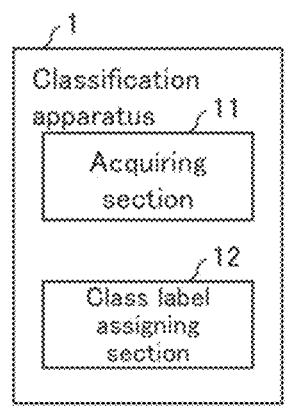
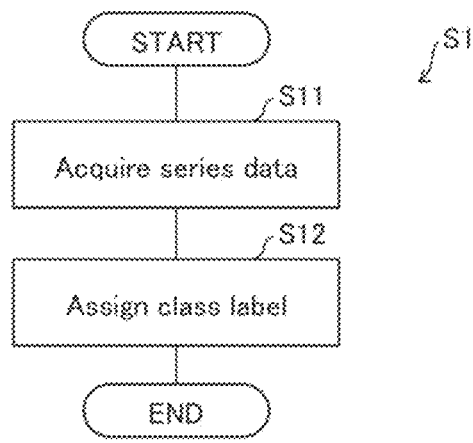

CLASSIFICATION APPARATUS, CLASSIFICATION METHOD, AND RECORDING MEDIUM

This application is a National Stage Entry of PCT/JP2021/042149 filed on Nov. 17, 2021, the contents of all of which are incorporated herein by reference, in their entirety.

TECHNICAL FIELD

The present invention relates to a classification apparatus, a classification method, and a recording medium.

BACKGROUND ART

Techniques are known for referring to series data such as time-series data to perform labeling of an event being taking place and a location (time) in the series at which the event is taking place. Such techniques are also referred to as temporal localization (TL). For example, Non-Patent Literature 1 discloses a technique for performing temporal localization on untrimmed videos.

CITATION LIST

Non-Patent Literature

[Non-Patent Literature 1]
Shou, Zheng, Dongang Wang, and Shih-Fu Chang, "Temporal action localization in untrimmed videos via multi-stage cnns," Proceedings of the IEEE conference on computer vision and pattern recognition, 2016

SUMMARY OF INVENTION

Technical Problem

Incidentally, there can be lack of clarity at boundaries of an event (e.g., when the event starts (starting time) and when the event ends (ending time)) in series data. With the technique disclosed in Non-Patent Literature 1, appropriately assigning a label in such a situation is difficult.

An example aspect of the present invention has been made in view of the above problem, and an example object thereof is to provide a technique for making it possible to suitably perform labeling even in a case where there is an unclear event boundary.

Solution to Problem

A classification apparatus in accordance with an example aspect of the present invention includes at least one processor, and the at least one processor carries out: an acquiring process of acquiring series data; and a class label assigning process of assigning a class label to each piece of element data contained in the series data, by repeatedly applying quickest change detection to the series data.

A classification method in accordance with an example aspect of the present invention includes: acquiring series data; and assigning a class label to each piece of element data contained in the series data, by repeatedly applying quickest change detection to the series data.

A recording medium in accordance with an example aspect of the present invention is a computer-readable, non-transitory recording medium having recorded thereon a program for causing a computer to function as a classification apparatus, and the program is for causing the computer to carry out: a process of acquiring series data; and a process of assigning a class label to each piece of element data contained in the series data, by repeatedly applying quickest change detection to the series data.

Advantageous Effects of Invention

With an example aspect of the present invention, it is possible to suitably perform labeling even in a case where there is an unclear event boundary.

BRIEF DESCRIPTION OF DRAWINGS

FIG. 1 is a block diagram illustrating a configuration of a classification apparatus in accordance with a first example embodiment.

FIG. 2 is a flowchart illustrating a flow of a classification method in accordance with the first example embodiment.

EXAMPLE EMBODIMENTS

First Example Embodiment

Figure 3:
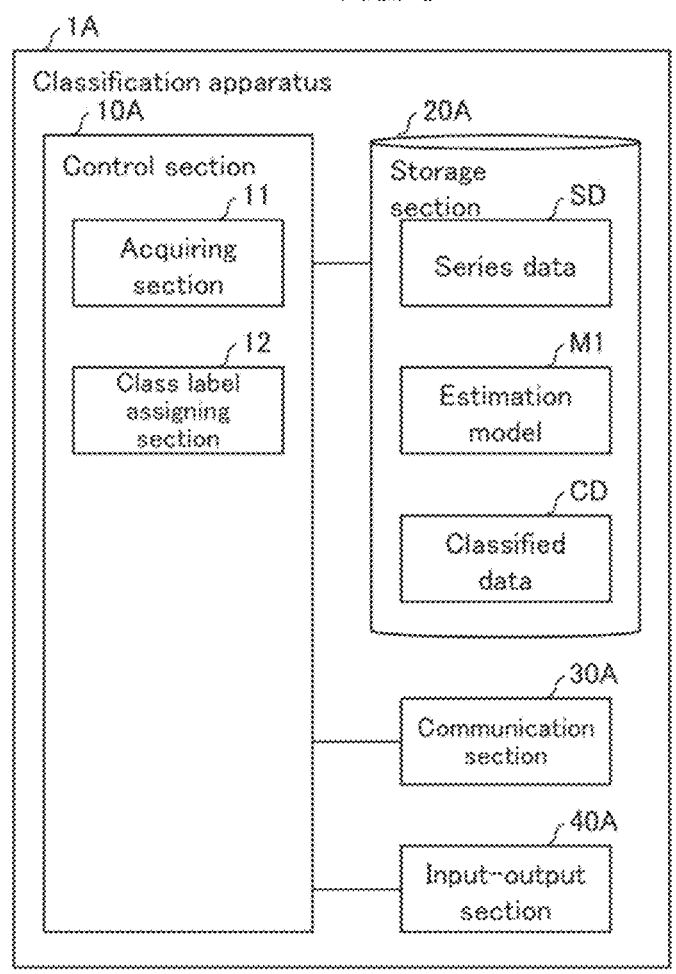
FIG. 3 is a block diagram illustrating a configuration of a classification apparatus in accordance with a second example embodiment.

The following description will discuss a first example embodiment of the present invention in detail, with reference to the drawings. The present example embodiment is basic to example embodiments which will be described later.

<Outline of Classification Apparatus>

A classification apparatus 1 in accordance with the present example embodiment classifies series data into a plurality of events. The series data is ordered data which includes one or more pieces of element data. In other words, the series data is constituted by the one or more pieces of element data. As an example, the series data is moving image data or voice data. Further, the series data may be data representing changes in power consumption. The series data is not limited to time-series data, in which pieces of element data are arranged on a time-series basis, but may be data in which pieces of element data are arranged on the basis of another series. The element data is data which is an element forming a part of the series data. Examples of the element data include a frame in moving images.

The classification apparatus 1 assigns a class label to each piece of element data contained in the series data, to classify the pieces of element data into a plurality of events. The class label is a label indicating an event. As an example, the class label is a label indicating an action (a jump, etc.) of a subject, the details of work carried out by a worker, information for identifying a speaker, or a phenomenon related to power consumption. The event is the action of a target object. As an example, the event is the action (a jump, etc.) of a subject, work carried out by a worker, the speech of a speaker, an action related to power consumption.

As an example, the classification apparatus 1 keeps logs of the details of work carried out by a worker, on the basis of a video on a monitoring camera at a construction site under construction, to create a work diary. In this case, the series data is video data representing the video captured by the monitoring camera. The class label is a label indicating the details of work carried out by a worker, and examples thereof include "background class", and "work w1", "work w2", "work w3", and so on. In this case, the "background class" is the class label which is assigned in a case where, for example, the element data is not classified into any of the "work w1", "work w2", and so on.

As another example, the classification apparatus 1 performs a behavioral analysis of analyzing what thing was carried out and when and where the thing was carried out, on the basis of the video on the monitoring camera. In this case, the series data is video data representing the video captured by the monitoring camera. The class label is a label indicating the action (e.g., a jump, etc.) of a subject captured by the monitoring camera, and examples thereof include "background class", and "action a1", "action a2", "action a3", and so on. In this case, the "background class" is the class label which is assigned in a case where, for example, the element data is not classified into any of the "action a1", "action a2", and so on.

As another example, the classification apparatus 1 keeps logs of who is speaking and when the speech is being made, on the basis of voice data obtained in a meeting. In this case, the series data is voice data obtained by recording the meeting. The class label is a label for identifying a speaker, and examples thereof include "background class", and "speaker s1", "speaker s2", "speaker s3", and so on. In this case, the "background class" is the class label which is assigned in a case where, for example, the element data is not classified into any of the "speaker s1", "speaker s2", and so on.

As another example, the classification apparatus 1 analyzes what a certain speaker is feeling, on the basis of the speaker's voice data. In this case, the series data is recorded audio data obtained by recording the voice of a certain speaker. The class label is a label indicating the classification result (e.g., feeling m1, feeling m2, and so on) of classifying the speaker's feeling, and examples thereof include "background class", and "feeling m1", "feeling m2", "feeling m3", and so on. In this case, the "background class" is the class label which is assigned in a case where, for example, the element data is not classified into any of the "feeling m1", "feeling m2", and so on.

As still another example, the classification apparatus 1 analyzes what thing was being done and when the thing was being done, on the basis of power consumption data for each time. In this case, the series data indicates changes in power consumption, and the class label indicates an action related to power consumption.

<Configuration of Classification Apparatus>

The configuration of a classification apparatus 1 will be described below with reference to FIG. 1. FIG. 1 is a block diagram illustrating a configuration of the classification apparatus 1. The classification apparatus 1 includes an acquiring section 11 and a class label assigning section 12.

(Acquiring Section 11)

The acquiring section 11 acquires series data. The acquiring section 11 may acquire the series data by batch, or may acquire the series data sequentially.

(Class Label Assigning Section 12)

The class label assigning section 12 repeatedly applies quickest change detection to the series data, to assign a class label to each piece of element data contained in the series data. In other words, the class label assigning section 12 assigns a class label to each piece of element data contained in the series data, according to the result of quickest change detection applied to the series data. The quickest change detection (QCD) is a method by which to detect a location (change point) at which a feature of the series data changes. Examples of the quickest change detection method include, but are not limited to, a dynamic cumulative sum test (D-CUSUM) algorithm. Examples of the D-CUSUM method include the method disclosed in "G. Rovatsos, X. Jiang, A. D. Dominguez-Garcia and V. V. Veeravalli, 'Statistical Power System Line Outage Detection Under Transient Dynamics,' in IEEE Transactions on Signal Processing, vol. 65, no. 11, pp. 2787-2797, 1 Jun. 2017, doi: 10.1109/TSP.2017.2673802".

As an example, the class label assigning section 12 repeatedly applies quickest change detection to the series data, and assigns, to pieces of element data from the location at which a point of change to a certain class is detected to the location at which the next point of change is detected, the labels of the class. More specifically, as an example, the class label assigning section 12 sequentially calculates a statistic obtained by referring to each piece of element data contained in the series data and compares the statistic calculated to a threshold, to determine a class transition.

For example, the class label assigning section 12 applies quickest change detection to video data to determine a class transition of the location at which a change point is detected. As an example, in a case where the class label assigning section 12 has determined, through the quickest change detection, that the "background class" has transitioned to the "work w1", the class label assigning section 12 assigns the class labels "work w1" to pieces of element data until the next change point is detected. As another example, in a case of determining, through quickest change detection, that the "work w1" has transitioned to the "work w2", the class label assigning section 12 assigns the class label "work w2" to pieces of element data from element data for which a transition has been determined to element data for which the next change point is detected.

As above, the configuration in which series data is acquired, and by repeatedly applying quickest change detection to the series data acquired, a class label is assigned to each piece of element data contained in the series data is adopted in the classification apparatus 1 in accordance with the present example embodiment. Since the quickest change detection is repeatedly applied to the series data, the classification apparatus 1 in accordance with the present example embodiment provides an example advantage of making it possible to suitably perform labeling even in a case where there is an unclear event boundary.

<Process Flow of Classification Method>

A flow of a classification method S1 in accordance with the present example embodiment will be described below with reference to FIG. 2. FIG. 2 is a flowchart illustrating a flow of the classification method S1. In step S11, the acquiring section 11 acquires series data. In step S12, the class label assigning section 12 repeatedly applies quickest change detection to the series data, to assign a class label to each piece of element data contained in the series data.

As above, the configuration in which series data is acquired, and by repeatedly applying quickest change detection to the series data acquired, a class label is assigned to each piece of element data contained in the series data is adopted in the classification method S1 in accordance with the present example embodiment. Thus, the classification method S1 in accordance with the present example embodiment provides an example advantage of making it possible to suitably perform labeling even in a case where there is an unclear event boundary.

Second Example Embodiment

The following description will discuss a second example embodiment of the present invention in detail, with reference to the drawings. The same reference sign is assigned to a component that has the same function as the component described in the first example embodiment, and the description thereof is not repeated.

<Configuration of Classification Apparatus 1A>

FIG. 3 is a block diagram illustrating a configuration of a classification apparatus 1A in accordance with the present example embodiment. The classification apparatus 1A includes a control section 10A, a storage section 20A, a communication section 30A, and an input-output section 40A.

(Communication Section 30A)

The communication section 30A communicates with an apparatus external to the classification apparatus 1A over a communication line. The present example embodiment does not limited to a specific configuration of the communication line, but examples of the communication line include a wireless local area network (LAN), a wired LAN, a wide area network (WAN), a public network, a mobile data communication network, and a combination thereof. The communication section 30A transmits, to another apparatus, data supplied from the control section 10A, and supplies the control section 10A with data received from another apparatus.

(Input-Output Section 40A)

To the input-output section 40A, input-output equipment such as a keyboard, a mouse, a display, a printer, or a touch panel is connected. The input-output section 40A accepts, from the input equipment connected thereto, input of various kinds of information to the classification apparatus 1A. In addition, the input-output section 40A outputs various kinds of information to the output equipment connected thereto, under the control of the control section 10A. Examples of the input-output section 40A include an interface such as a universal serial bus (USB).

(Control Section 10A)

The control section 10A includes the acquiring section 11 and the class label assigning section 12, as illustrated in FIG. 3.

(Acquiring Section 11)

The acquiring section 11 acquires series data SD. As an example, the acquiring section 11 acquires the series data SD from another apparatus via the communication section 30A. As another example, the acquiring section 11 may acquire the series data SD which is inputted via the input-output section 40A. As still another example, the acquiring section 11 may acquire the series data SD by retrieving the series data SD from the storage section 20A or externally connected storage.

As an example, the series data SD acquired by the acquiring section 11 is time-series data having temporal sequentiality. The series data SD contains at least one piece of element data $\Delta\hat{\theta}[k]$. The index k indicates the ordering of the element data $\Delta\hat{\theta}[k]$. In a case where the series data SD is time-series data, the index k indicates a time. However, the index k is not limited to an index indicating a time. For example, in a case where the series data SD is data containing a plurality of regions, the index k may be an index for identifying a region contained in the series data SD.

(Class Label Assigning Section 12)

The class label assigning section 12 repeatedly applies quickest change detection to the series data SD, to assign a class label l (l=0, 1, . . . , or L) to each piece of element data $\Delta\hat{\theta}[k]$ contained in the series data SD.

(Storage Section 20A)

In the storage section 20A, the series data SD acquired by the acquiring section 11 is stored, and in addition, classified data CD in which a class label l is assigned to each piece of element data $\Delta\hat{\theta}[k]$ of the series data is stored. Further, an estimation model M1 is stored in the storage section 20A. The estimation model M1 being stored in the storage section 20A refers to parameters which define the estimation model M1 being stored in the storage section 20A.

(Estimation Model M1)

The estimation model M1 is a model used by the class label assigning section 12 to assign a class label l to element data $\Delta\hat{\theta}[k]$. More specifically, as an example, the estimation model M1 is a model which estimates a density function $f^{(i)}{}_l(\Delta\hat{\theta}[k])$ used for calculating a statistic $W^D{}_l[k]$ obtained by referring to the element data $\Delta\hat{\theta}[k]$. The index i (i=0, 1, . . . , T; T is an integer of not less than 0) is an index for identifying a transition phase $p_i$.

The transition phase $p_i$ indicates an interval in which a feature of the series data SD changes. In some cases, a feature of the series data SD abruptly changes in a short time period. In other cases, a feature of the series data SD gently changes to eventually become stable. For example, as a method for detecting such a gentle change, the D-CUSUM method described above is used. Specific examples of the transition phase $p_i$ in accordance with the present example embodiment will be described below with reference to FIG. 4.

Figure 4:
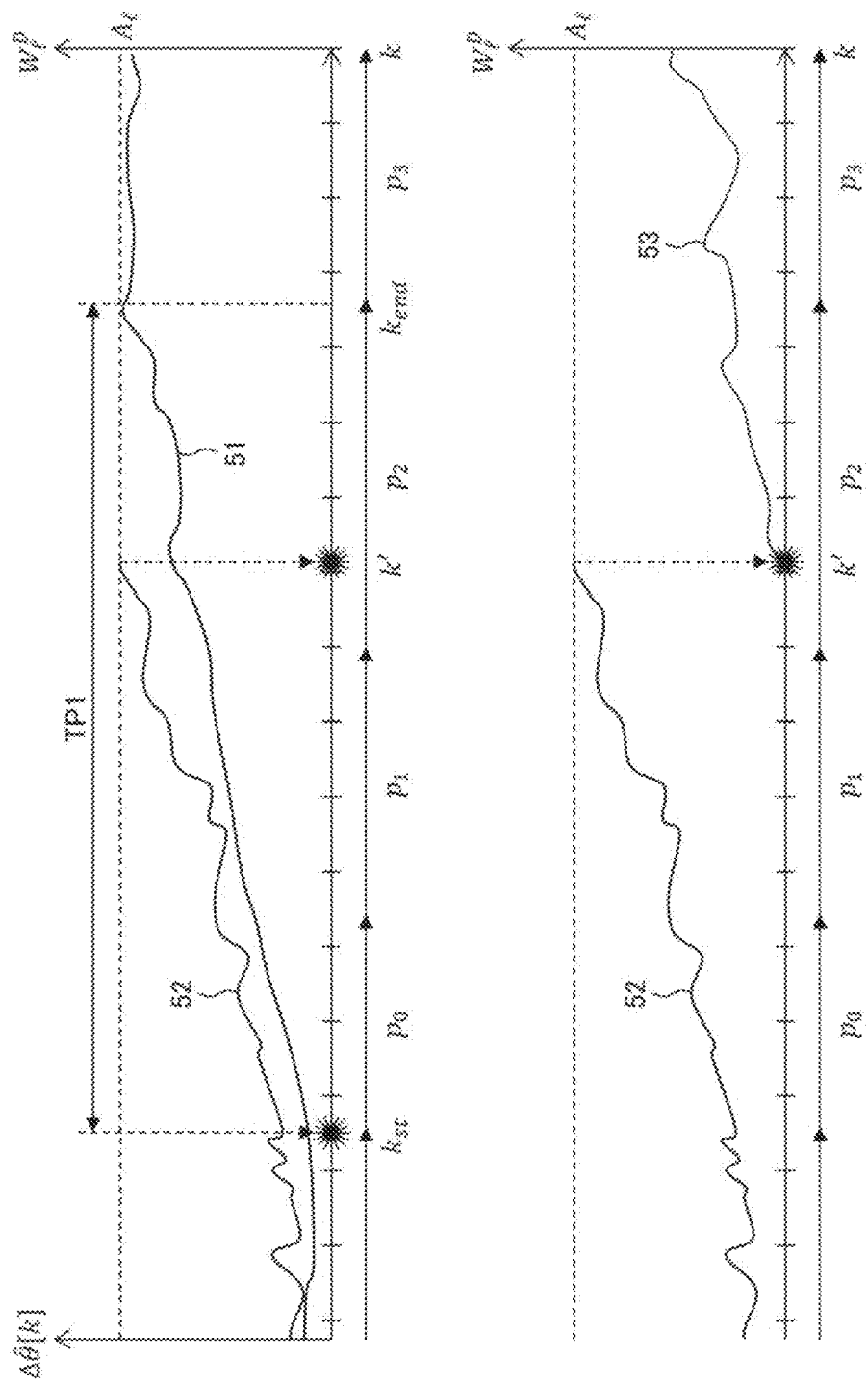
FIG. 4 is a representation illustrating specific examples of series data in accordance with the second example embodiment.

FIG. 4 is a representation illustrating specific examples of the series data SD. For a graph 51 illustrated in the upper part of FIG. 4, the horizontal axis represents the index k, and the vertical axis represents a feature of element data $\Delta\hat{\theta}[k]$ contained in the series data SD. In the example of FIG. 4, in an interval TP1 ranging from the index $k_{st}$ to index $k_{end}$, the feature of the element data $\Delta\hat{\theta}[k]$ gently changes, and at the index $k_{end}$ and afterward, the feature of the element data $\Delta\hat{\theta}[k]$ is stable.

According to the present example embodiment, the class label assigning section 12 carries out a computation under the assumption that the interval in which a feature of the series data SD changes contains one or more transition phases $p_i$ which are identified by the index i (i=0, 1, . . . , T). In this respect, in the one or more transition phases $p_i$, the feature of the series data SD changes from a transition phase $p_0$ to a transition phase $p_{(T-1)}$, and the last phase $p_T$ is a stable phase in which the change has terminated. For example, in a case of T=3, the class label assigning section 12 carries out a computation under the assumption that there are transition phases $p_0$ to $p_2$ in which the feature of the series data SD changes and a transition phase $p_3$ in which the feature of the series data SD is stable.

The density function $f^{(i)}{}_l(\Delta\hat{\theta}[k])$ estimated by the estimation model M1 is a density function of the class label l estimated in a case of making the assumption that the index k of element data $\Delta\hat{\theta}[k]$ is contained in a transition phase $p_i$ (i=0, 1, ..., T). In other words, the density function $f^{(i)}_l(\Delta\hat{\theta}[k])$ is a function estimated for each index i and for each class label l, in relation to an index k.

As an example, the estimation model M1 is a trained model constructed by machine learning so as to receive an element data $\Delta\hat{\theta}[k]$ as an input and output a density function $f^{(i)}_l(\Delta\hat{\theta}[k])$. The training of the estimation model M1 may be carried out by the control section 10A of the classification apparatus 1A, or may be carried out by another apparatus. Without limitation and as an example, as a method for training the estimation model M1 by machine learning, a decision tree-based method, a linear regression method, or a neural network method may be used, or two or more of these methods may be used. Examples of the decision tree-based method include a light gradient boosting machine (Light-GBM), a random forest, and XGBoost. Examples of the linear regression method include Bayesian regression, support vector regression, Ridge regression, Lasso regression, and ElasticNet. Examples of the neural network method include deep learning.

However, the estimation model M1 is not limited to a trained model constructed by machine learning, but may be another model. For example, the estimation model M1 may be a rule-based system or a system which refers to an external database.

<Flow of Classification Method Carried Out by Classification Apparatus 1A>

Figure 5:
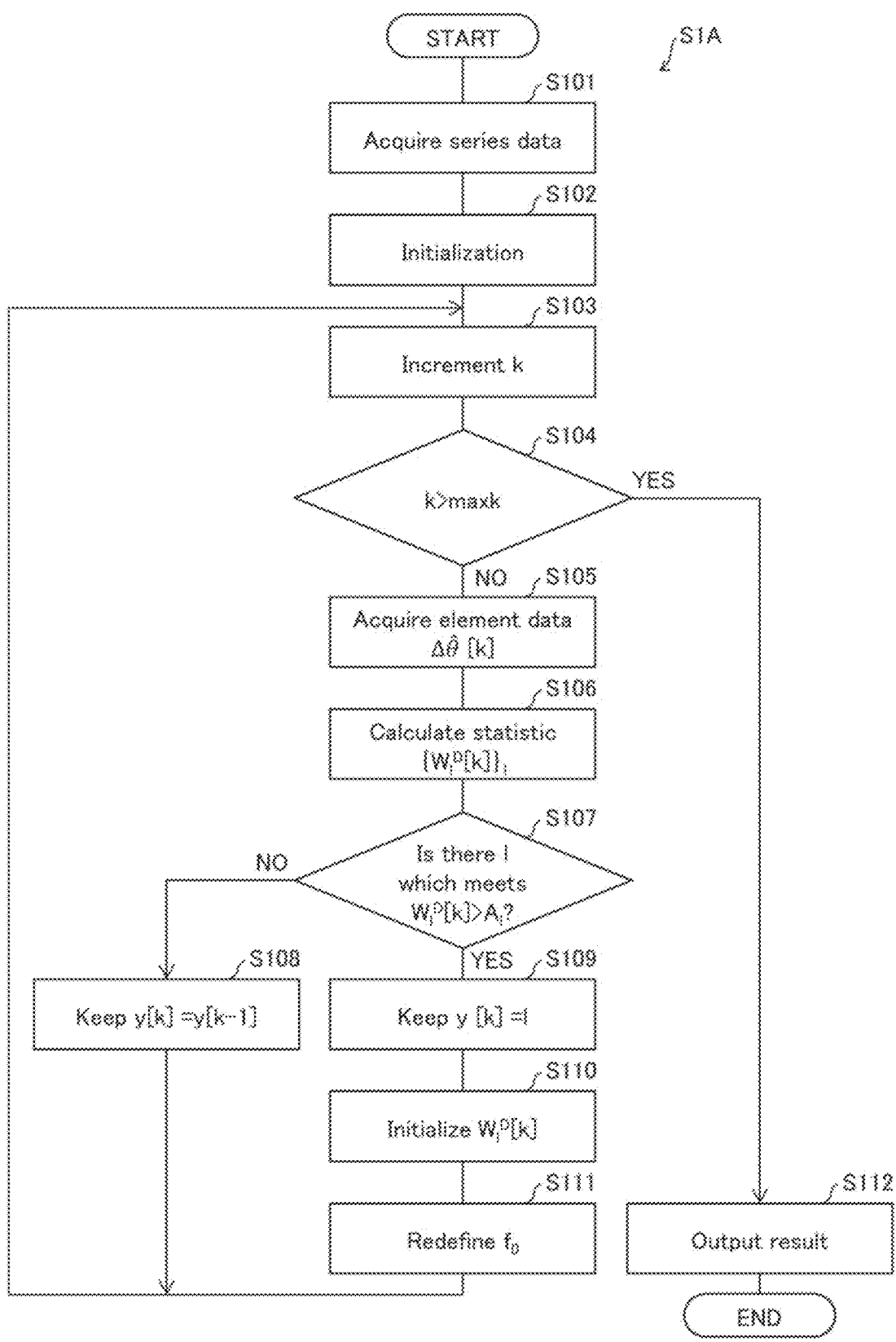
FIG. 5 is a flowchart illustrating a flow of a classification method in accordance with the second example embodiment.

A flow of the classification method carried out by the classification apparatus 1A configured as described above will be described below with reference to the drawings. FIG. 5 is a flowchart illustrating a flow of a classification method S1A, which is an example of the classification method carried out by the classification apparatus 1A. It should be noted that explanation of the content explained above will not be repeated.

(Step S101)

In step S101, the acquiring section 11 acquires series data SD. As an example, the acquiring section 11 may receive the series data SD from another apparatus via the communication section 30A, or may acquire the series data SD inputted via the input-output section 40A. Further, the acquiring section 11 may acquire the series data SD by retrieving the series data SD from the storage section 20A or external storage.

(Steps S102 to S110)

The class label assigning section 12 carries out processes of step S102 to step S110, to assign a class label y[k] to each piece of element data $\Delta\hat{\theta}[k]$ contained in the series data SD. As an example, the class label assigning section 12 sequentially calculates a statistic obtained by referring to each piece of element data $\Delta\hat{\theta}[k]$ contained in the series data SD, and compares the statistic calculated to threshold, to determine a class transition. According to the present example embodiment, a statistic $W^D_l[k]$ for each class label l calculated with use of the density function $f^{(i)}_l(\Delta\hat{\theta}[k])$ estimated by the estimation model M1 is used.

(Step S102)

In step S102, the class label assigning section 12 carries out various types of initialization processes. As an example, the class label assigning section 12 not only sets a counter k which is a loop counter to "0" but also sets class label y(0) to a predetermined class label (e.g., the "background class"). Further, the class label assigning section 12 sets the statistic $W^D_l[0]$ to an initial value (e.g., "0"). Furthermore, the class label assigning section 12 provides a predetermined initial distribution as the initial distribution $f_0(\Delta\hat{\theta}[k])$ of a density function.

(Step S103)

In step S103, the class label assigning section 12 increments the counter k.

(Step S104)

In step S104, the class label assigning section 12 judges whether the counter k is greater than a predetermined maximum value maxk. The maximum value maxk is set in advance by, for example, an administrator or the like of the classification apparatus 1. In a case where the counter k is not greater than the maximum value maxk (NO in step S104), the class label assigning section 12 proceeds to step S105. On the other hand, in a case where the counter k is greater than the maximum value maxk (YES in step S104), the class label assigning section 12 proceeds to the process of step S110.

(Steps S105 and S106)

In step S105, the class label assigning section 12 acquires element data $\Delta\hat{\theta}[k]$. In step S106, the class label assigning section 12 uses the estimation model M1 to calculate a statistic $\{W^D_l[k]\}$. The statistic $\{W^D_l[k]\}$ is a set of statistics each of which is the statistic $W^D_l[k]$ calculated for each class label l (l=0, 1, ..., or L).

As an example, the statistic $W^D_l[k]$ is expressed with use of a cumulative density function ratio $\Omega^{(i)}_l[k]$. As an example, with use of:

(i) the index i (i=0, 1, ..., T) for identifying a transition phase;
(ii) the index k which indicates the ordering of element data $\Delta\hat{\theta}[k]$;
(iii) the class label l (l=0, 1, ..., or L);
(iv) the density function $f^{(i)}_l(\Delta\hat{\theta}[k])$; and
(v) the initial distribution $f_0(\Delta\hat{\theta}[k])$ of the density function, the cumulative density function ratio $\Omega^{(i)}_l[k]$ is expressed as $$\Omega^{(i)}_\ell[k] = \max\{\Omega^{(i)}_\ell[k-1], \Omega^{(i-1)}_\ell[k-1]\} + \log\frac{f^{(i)}_\ell(\Delta\hat{\theta}[k])}{f_0(\Delta\hat{\theta}[k])}$$

$$\Omega^{(0)}_\ell[k] := \log\frac{f^{(0)}_\ell(\Delta\hat{\theta}[k])}{f_0(\Delta\hat{\theta}[k])}$$

where the maximum value T of the index i of the transition phase is set in advance by, for example, an administrator or the like of the classification apparatus 1.

As an example, with use of the cumulative density function ratio $\Omega^{(i)}_l[k]$, the statistic $W^D_l[k]$ is expressed as $$W^D_\ell[k] = \max\{\Omega^{(0)}_\ell[k], \ldots, \Omega^{(T)}_\ell[k], 0\}$$

As an example, in the process of step S106 of calculating the statistic $W^D_l[k]$, the class label assigning section 12 uses, as the density function $f^{(i)}_l(\Delta\hat{\theta}[k])$ for calculating the statistic $W^D_l[k]$, a density function estimated by the estimation model M1 trained in advance. In this case, the class label assigning section 12 uses the density function $f^{(i)}_l(\Delta\hat{\theta}[k])$ obtained by inputting $\Delta\hat{\theta}[k]$ to the estimation model M1, to calculate the statistic $W^D_l[k]$.

Examples of a method for estimating the density function $f^{(i)}_l(\Delta\hat{\theta}[k])$ include (i) parametric estimation and (ii) non-parametric estimation. (i) Parametric estimation is a method of estimating, under the assumption that the input follows a particular distribution (e.g., a Gaussian distribution), parameters (mean and covariance matrix for a Gaussian distribution) which define a distribution such that the distribution fits the input. Examples of parametric estimation include maximum-likelihood estimation.

In a case of (ii) nonparametric estimation, as an example, the class label assigning section 12 uses the estimation model M1 trained to learn the density ratio via a deep neural network (DNN) with use of a loss function for density ratio estimation, in order to find a density ratio such as the ratio between the density function $f^{(i)}{}_l(\hat{\Delta}\theta[k])$ of the class label l and the density function $f^{(i)}{}_{l'}(\hat{\Delta}\theta[k])$ of a post-transition class label l'. In this case, the technique disclosed in, for example, "Akinori F. Ebihara et. al., SEQUENTIAL DENSITY RATIO ESTIMATION FOR SIMULTANEOUS OPTIMIZATION OF SPEED AND ACCURACY, https://openreview.net/forum?id=Rhsu5qD36cL" or in "Taiki Miyagawa et. al., 'The Power of Log-Sum-Exp: Sequential Density Ratio Matrix Estimation for Speed-Accuracy Optimization,' https://proceedings.mlr.press/v139/miyagawa21a.html" is used. However, the density function used by the class label assigning section 12 is not limited to the above-described examples. The class label assigning section 12 may use a density function estimated by another method to calculate the statistic $W^D{}_l[k]$.

The class label assigning section 12 calculates the statistic $W^D{}_l[k]$ for each class label l in relation to each piece of element data $\hat{\Delta}\theta[k]$. The statistic $W^D{}_l[k]$ can be said to be a value which indicates the degree of confidence of the transition to a class of the class label l in the index k.
(Step S107)

In step S107, the class label assigning section 12 determines whether there is the class label l which meets a condition of the statistic $W^D{}_l[k]$ being greater than a threshold $A_l$. The threshold $A_l$ is a threshold set in advance for each class label l. In a case where there is the class label l which meets the above condition (YES in step S107), the class label assigning section 12 proceeds to step S108. On the other hand, in a case where there is not the class label l which meets the above condition (NO in step S107), the class label assigning section 12 proceeds to step S109.
(Step S108)

In step S108, the class label assigning section 12 keeps the class label y[k]=y[k−1]. In other words, in a case where the statistic $W^D{}_l[k]$ is not greater than the threshold $A_l$ for any class label l, the class label assigning section 12 assigns, to the element data $\hat{\Delta}\theta[k]$, the class label assigned to element data $\hat{\Delta}[k-1]$ (i.e., the class label assigned to the element data preceding by one). When the process of step S108 ends, the class label assigning section 12 returns to the process of step S103, to determine a class transition in relation to the next index k.
(Step S109)

In step S109, the class label assigning section 12 keeps the class label y[k]=l. In other words, the class label assigning section 12 assigns, to the element data $\hat{\Delta}\theta[k]$, the class label l the statistic $W^D{}_l[k]$ of which is greater than the threshold $A_l$. In a case where there are a plurality of class labels l the statistics $W^D{}_l[k]$ of which are greater than the threshold $A_l$, the class label assigning section 12 may select, for example, the class label l the statistic $W^D{}_l[k]$ of which has the greatest difference from the threshold, and assign this class label l to the element data $\hat{\Delta}\theta[k]$.
(Steps S110 and S111)

In step S110, the class label assigning section 12 initializes the statistic $W^D{}_l[k]$. Further, in step S111, the class label assigning section 12 redefines the initial distribution $f_0$. In other words, each time a statistic $W^D{}_l[k]$ reaches the threshold $A_l$ (YES in step S107), the class label assigning section 12 carries out initialization of the statistic $W^D{}_l[k]$ (step S110) and redefinition of the initial distribution $f_0$ of a density function used to calculate the statistic $W^D{}_l[k]$ (step S111).

As an example, the class label assigning section 12 redefines the initial distribution $f_0$ of a density function with use of the density function $f^{(T)}{}_l(\hat{\Delta}\theta[k])$ of the transition phase T of the class label l which has been set to the class label y[k] in step S109. Since the transition phase T is a stable phase following the termination of changes in the series data SD, the class label assigning section 12 uses the density function $f^{(T)}{}_l(\hat{\Delta}\theta[k])$ of the stable transition phase T as the initial distribution in quickest change detection performed thereafter.

When the process of step S111 ends, the class label assigning section 12 returns to the process of step S103, to determine a class transition in relation to the next counter k.
(Step S112)

In step S112, the class label assigning section 12 outputs a result of the assignment of the class label l to each piece of element data $\hat{\Delta}\theta[k]$. As an example, the class label assigning section 12 outputs the classified data CD in which the class label l is assigned to each piece of element data $\hat{\Delta}\theta[k]$. The class label assigning section 12 may output the classified data CD to output equipment (such as a display or printer) connected thereto via the input-output section 40A, or may transmit the classified data CD to another apparatus via the communication section 30A. Alternatively, the class label assigning section 12 may output the classified data CD by writing the classified data CD in the storage section 20A or external storage.

A specific example of the class label assigning process carried out by the class label assigning section 12 will be described below with reference to FIG. 4. A graph 52 illustrated in the upper part of FIG. 4 is a graph illustrating the statistic $W^D{}_l[k]$. For the graph 52, the horizontal axis represents the index k, and the vertical axis represents the statistic $W^D{}_l[k]$. In the example illustrated in FIG. 4, the statistic $W^D{}_l[k]$ increases as the index k advances, and a statistic $W^D{}_l[k']$ reaches the threshold $A_l$ at an index k'. The class label assigning section 12 determines that there is a class transition at the index k' (YES in step S107), and uses, as the class label of element data $\hat{\Delta}\theta[k']$, a class label l' the statistic $W^D{}_{l'}[k']$ of which reaches the threshold $A_{l'}$ (step S109). In other words, in this example, the class label assigning section 12 determines that the index k' is an event boundary.

Further, the class label assigning section 12 carries out the initialization of the statistic $W^D{}_l[k]$ and the redefinition of the initial distribution $f_0(\hat{\Delta}\theta[k])$ of the density function, at index k' (steps S110 and S111). Illustrated in the lower part of FIG. 4 are the graph 52 of the statistic $W^D{}_l[k]$ until the statistic is initialized at the index k' and a graph 53 of the statistic $W^D{}_l[k]$ after the initialization. At the index k' and afterward, until the statistic $W^D{}_l[k]$ reaches the threshold $A_l$ again, the class label assigning section 12 assigns, to element data $\hat{\Delta}\theta[k]$, the class label l' assigned to the element data $\hat{\Delta}\theta[k']$.

The class label assigning section 12 repeatedly carries out the processes of steps S103 to S111 in FIG. 5, so that the class label y[k] is assigned to each piece of element data $\hat{\Delta}\theta[k]$.

<Example Advantage of Classification Apparatus 1A>

Incidentally, in the technique for performing classification and labeling on the series data SD, the starting location (such as a starting time) and the ending location (such as an ending time) of an event can be unclear. Examples of such ambiguity include whether the start of a "jump" event is the moment at which a subject starts to bend the knees or the moment at which the feet of the subject leave the ground. This leads to a deterioration in performance in a case of machine learning-based labeling, unless an unclear boundary is explicitly modeled. In contrast, according to the present example embodiment, the class label assigning section 12 repeatedly applies quickest change detection to the series data SD, so that it is possible to suitably perform labeling even in a case where there is an unclear event boundary.

As above, a configuration adopted in the classification apparatus 1A in accordance with the present example embodiment is the configuration in which the class label assigning section 12 sequentially calculates a statistic $W^D_l[k]$ and compares the statistic to a threshold to determine a class transition, and each time the statistic $W^D_l[k]$ reaches the threshold $A_l$, carries out initialization of the statistic $W^D_l[k]$ and redefinition of the initial distribution of a density function used to calculate the statistic $W^D_l[k]$. Thus, with the classification apparatus 1A in accordance with the present example embodiment, in addition to the example advantage produced by the classification apparatus 1 in accordance with the first example embodiment, it is possible to suitably determine an event boundary to perform labeling, even in a case where changes in the series data SD are not abrupt but gentle.

In addition, the configuration in which a class transition is determined by referring to the statistic $W^D_l[k]$ expressed with use of a cumulative density function ratio is adopted in the classification apparatus 1A in accordance with the present example embodiment. Thus, with the classification apparatus 1A in accordance with the present example embodiment, in addition to the example advantage produced by the classification apparatus 1 in accordance with the first example embodiment, it is possible to more suitably determine an event boundary to perform labeling.

Third Example Embodiment

The following description will discuss a third example embodiment of the present invention in detail, with reference to the drawings. The same reference sign is assigned to a component that has the same function as the component described in the first example embodiment, and the description thereof is not repeated.

<Configuration of Classification Apparatus 1B>

Figure 6:
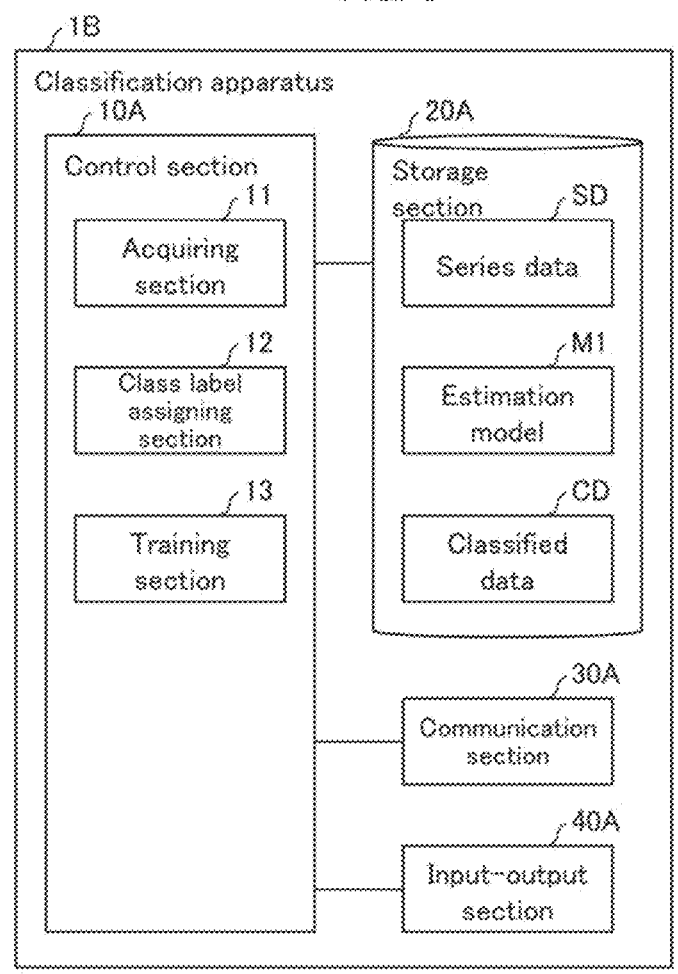
FIG. 6 is a block diagram illustrating a configuration of a classification apparatus in accordance with a third example embodiment.

FIG. 6 is a block diagram illustrating a configuration of a classification apparatus 1B. The classification apparatus 1B includes a control section 10A, a storage section 20A, a communication section 30A, and an input-output section 40A. The control section 10A includes a training section 13, in addition to an acquiring section 11 and a class label assigning section 12. Further, in the present example embodiment, an estimation model M1 is a trained model constructed by machine learning in which labeled training data is used.

The acquiring section 11 acquires labeled training data S to be used for training the estimation model M1. The labeled training data S includes series data $\{x_j[k]\}_k$ and a ground truth label $y_j$ assigned to each piece of element data $x_j[k]$ contained in the series data $\{x_j[k]\}_k$. An index j ($1 \leq j \leq N$) is an index for identifying a sample, and N is the number of samples.

As an example, the labeled training data S is expressed as indicated below, with use of: the number N of samples; the index j for identifying a sample; and the number $m_j$ of intervals contained in a sample identified by the index j.

$$S = \{(\{x_j[k]\}_k, (s_{j,1}, e_{j,1}, y_{j,1}), \ldots, (s_{j,m_j}, e_{j,m_j}, y_{j,m_j}))\}_{j=1}^N$$

In the labeled training data S above, an interval ($s_{j,h}$, $e_{j,h}$, $y_{j,h}$) (h is an index for identifying an interval, and $1 \leq h \leq m_j$) is an interval which extends from a starting location $s_{j,h}$ to an ending location $e_{j,h}$ and in which a class label $y_{j,h}$ is assigned to the element data $x_j[k]$.

The starting location $s_j$ of an interval, the ending location $e_j$ of the interval, and the class label $y_j$ are expressed as follows.

$$s_j = (s_{j,1}, \ldots, s_{j,m_j})$$
$$e_j = (e_{j,1}, \ldots, e_{j,m_j})$$
$$y_j = (y_{j,1}, \ldots, y_{j,m_j})$$

The training section 13 refers to the labeled training data S to train the estimation model M1. The training section 13 trains the estimation model M1 for estimating a density function $f^{(i)}_l(\Delta\hat{\theta}[k])$, by, for example, a decision tree-based method, a linear regression method, or a neural network method.

As above, the configuration in which the estimation model M1 is trained by referring to labeled training data which includes: series data; and a ground truth label assigned to each piece of element data contained in the series data is adopted in the classification apparatus 1B in accordance with the present example embodiment. Thus, in addition to the example advantage produced by the classification apparatus 1 in accordance with the first example embodiment, the classification apparatus 1B in accordance with the present example embodiment provides an example advantage of making it possible to estimate a density function with use of the estimation model M1 trained.

Fourth Example Embodiment

The following description will discuss a fourth example embodiment of the present invention in detail, with reference to the drawings. The same reference sign is assigned to a component that has the same function as the component described in the first to third example embodiments, and the description thereof is not repeated.

Figure 7:
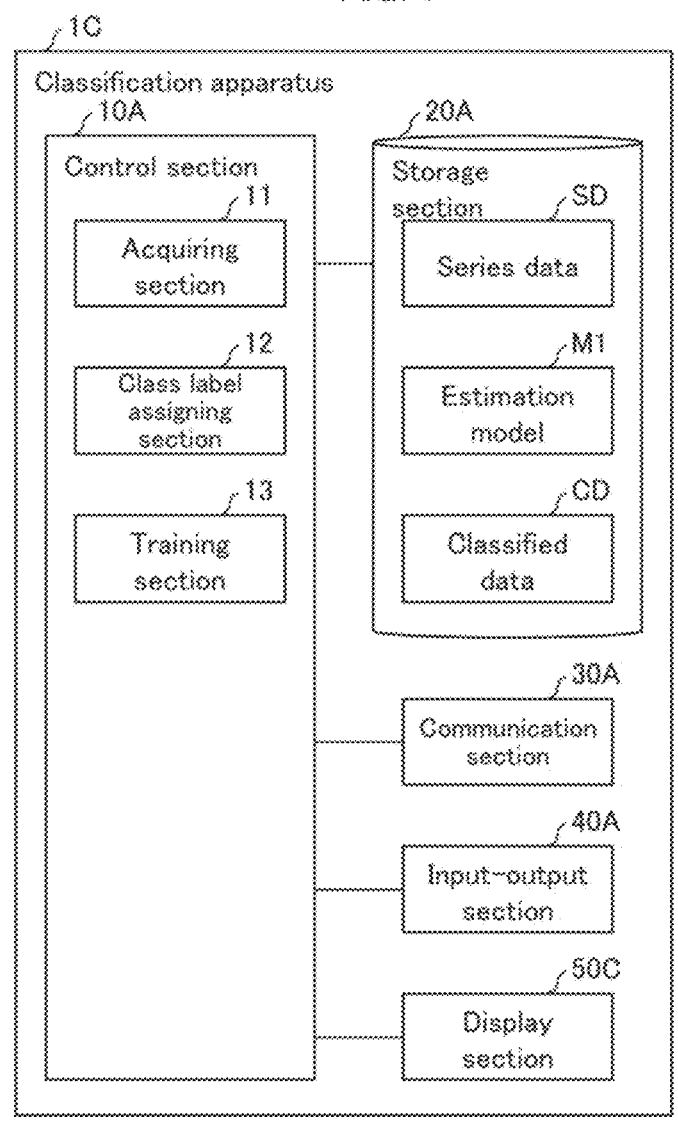
FIG. 7 is a block diagram illustrating a configuration of a classification apparatus in accordance with a fourth example embodiment.

FIG. 7 is a block diagram illustrating a configuration of a classification apparatus 1C in accordance with the present example embodiment. The classification apparatus 1C includes a display section 50C, in addition to a control section 10A, a storage section 20A, a communication section 30A, and an input-output section 40A. The display section 50C displays various types of information on the basis of data supplied by the control section 10A. As an example, the display section 50C displays a class label y[k] assigned by a class label assigning section 12, together with at least some pieces of element data $\Delta\hat{\theta}[k]$ contained in series data SD.

Figure 8:
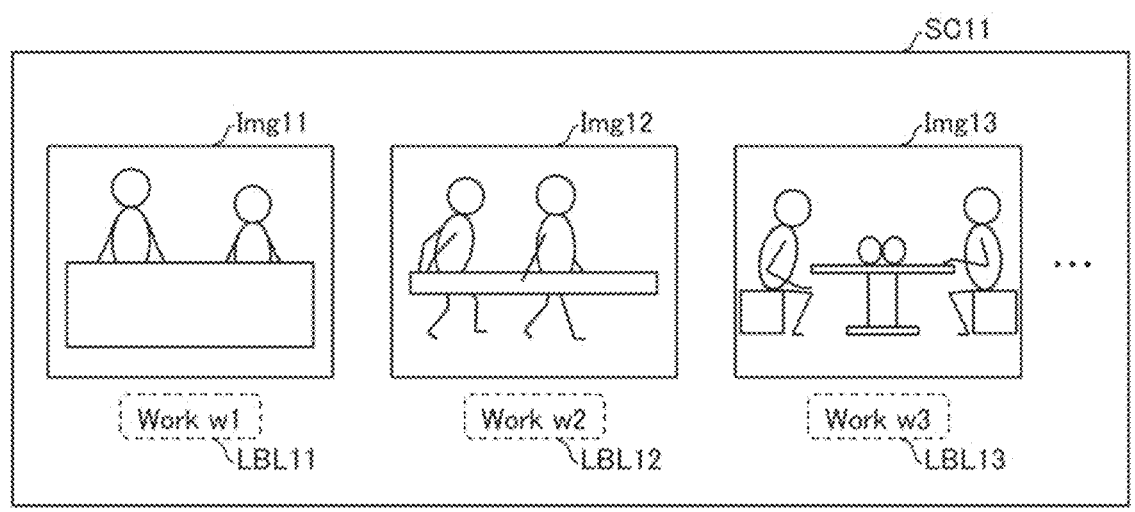
FIG. 8 is a representation illustrating an example display in accordance with the fourth example embodiment.

FIG. 8 is a representation illustrating a screen SC11, which is an example display of the display section 50C. On the screen SC11, the display section 50C displays a class label LBL11 together with an image Img11. The display section 50C also displays a class label LBL12 together with an image Img12. The display section 50C also displays a class label LBL13 together with an image Img13. The images Img11 to Img13 are, for example, frames contained in moving image data, and are examples of the element data $\Delta\hat{\theta}[k]$ in accordance with the present application. The class labels LBL11 to LBL13 are labels assigned by the class label assigning section 12 to the images Img11 to Img13, respectively.

From the screen displayed by the display section 50C, a user or the like of the classification apparatus 1C can understand the class label y[k] assigned to element data $\Delta\hat{\theta}[k]$ contained in the series data SD. Further, according to the present example embodiment, a user may change the class label y[k] displayed by the display section 50C, with use of input equipment connected via the input-output section 40A.

[Software Implementation Example]

Some or all of the functions of each of the classification apparatuses 1, 1A, and 1B may be implemented by hardware such as an integrated circuit (IC chip), or may be implemented by software.

Figure 9:
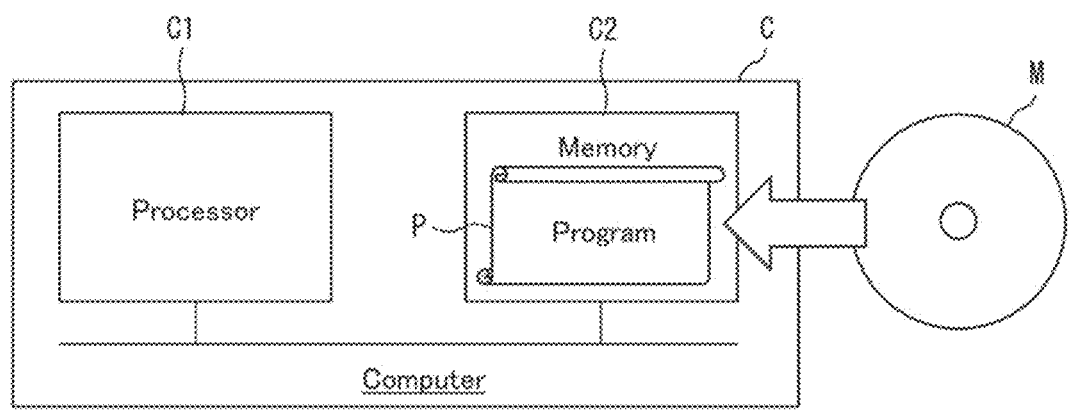
FIG. 9 is a block diagram illustrating a configuration of a computer which functions as the classification apparatuses in accordance with the example embodiments.

In the latter case, each of the classification apparatuses 1, 1A, and 1B is provided by, for example, a computer that executes instructions of a program that is software implementing the foregoing functions. An example (hereinafter, computer C) of such a computer is illustrated in FIG. 9. The computer C includes at least one processor C1 and at least one memory C2. The memory C2 has recorded thereon a program P for causing the computer C to operate as the classification apparatuses 1, 1A, and 1B. The processor C1 of the computer C retrieves the program P from the memory C2 and executes the program P, so that the functions of the classification apparatuses 1, 1A, and 1B are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted through a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the above example embodiments.

[Additional Remark 2]

The whole or part of the example embodiments disclosed above can be described as, but not limited to, the following supplementary notes.

(Supplementary Note 1)

A classification apparatus including:
 an acquiring means for acquiring series data; and
 a class label assigning means for assigning a class label to each piece of element data contained in the series data, by repeatedly applying quickest change detection to the series data.

With this configuration, it is possible to suitably perform labeling even in a case where there is an unclear event boundary.

(Supplementary Note 2)

The classification apparatus described in supplementary note 1, in which
 the class label assigning means is configured to
 sequentially calculate a statistic obtained by referring to each piece of element data contained in the series data and compare the statistic calculated to a threshold, to determine a class transition, and
 each time the statistic reaches the threshold,
 perform:
  initialization of the statistic; and
  redefinition of an initial distribution of a density function used for calculating the statistic.

With this configuration, it is possible to suitably determine an event boundary to perform labeling, even in a case where changes in series data are not abrupt but gentle.

(Supplementary Note 3)

The classification apparatus described in supplementary note 2, in which
 the class label assigning means is configured to
 use the following cumulative density function ratio:

$$\Omega_\ell^{(i)}[k] = \max\{\Omega_\ell^{(i)}[k-1], \Omega_\ell^{(i-1)}[k-1]\} + \log\frac{f_\ell^{(i)}(\Delta\hat{\theta}[k])}{f_0(\Delta\hat{\theta}[k])}$$

$$\Omega_\ell^{(0)}[k] := \log\frac{f_\ell^{(0)}(\Delta\hat{\theta}[k])}{f_0(\Delta\hat{\theta}[k])}$$

which is expressed with use of
 an index i (i=0, 1, . . . , T) for identifying a transition phase,
 an index k which indicates ordering of element data $\Delta\hat{\theta}[k]$,
 a class label l (l=0, 1, . . . , or L),
 a density function $f^{(i)}_\ell(\Delta\hat{\theta}[k])$, and
 an initial distribution $f_0(\Delta\hat{\theta}[k])$ of a density function, and refer to a statistic $W^D_\ell[k]$ expressed as $$W_\ell^D[k] = \max\{\Omega_\ell^{(0)}[k], \ldots, \Omega_\ell^{(T)}[k], 0\}$$

to determine the class transition.

With this configuration, it is possible to more suitably determine an event boundary to perform labeling, by referring to a statistic expressed with use of a cumulative density function ratio to determine a class transition.

(Supplementary Note 4)

The classification apparatus described in supplementary note 2 or 3, in which the class label assigning means is configured to use, as the density function for calculating the statistic, a density function estimated by an estimation model trained in advance.

With this configuration, it is possible to more suitably determine an event boundary to perform labeling, by using a density function estimated by an estimation model to calculate a statistic.

(Supplementary Note 5)

The classification apparatus described in supplementary note 4, in which the acquiring means is configured to acquire labeled training data which contains series data and a ground truth label assigned to each piece of element data contained in the series data, and the classification apparatus further includes a training means for training the estimation model by referring to the labeled training data.

With this configuration, it is possible to use an estimation model trained to estimate a density function.

(Supplementary Note 6)

The classification apparatus described in any one of supplementary notes 1 to 5, in which the series data is time-series data having temporal sequentiality.

With this configuration, it is possible to suitably perform labeling even in a case where there is an unclear event boundary in time-series data.

(Supplementary Note 7)

The classification apparatus described in any one of supplementary notes 1 to 6, further including a display means for displaying the class label assigned by the class label assigning means, together with at least some pieces of element data contained in the series data.

With this configuration, it is possible for a user or the like of a classification apparatus to understand a class label assigned to element data contained in series data.

(Supplementary Note 8)

A classification method including:

acquiring series data; and assigning a class label to each piece of element data contained in the series data, by repeatedly applying quickest change detection to the series data.

This classification method produces the same example advantage as the classification apparatus described above.

(Supplementary Note 9)

A program for causing a computer to carry out:

a process of acquiring series data; and a process of assigning a class label to each piece of element data contained in the series data, by repeatedly applying quickest change detection to the series data.

This configuration produces the same example advantage as the classification apparatus described above.

[Additional Remark 3]

The whole or part of the example embodiments disclosed above can be further described as the following supplementary notes.

A classification apparatus including at least one processor, the at least one processor carrying out: an acquiring process of acquiring series data; and a class label assigning process of assigning a class label to each piece of element data contained in the series data, by repeatedly applying quickest change detection to the series data.

The classification apparatus may further include a memory, and this memory may have stored therein a program for causing the at least one processor to carry out the acquiring process and the class label assigning process. In addition, a computer-readable, non-transitory, and tangible recording medium may have this program recorded thereon.

REFERENCE SIGNS LIST 1, 1A, 1B, 1C: Classification apparatus
10A: Control section
11: Acquiring section
12: Class label assigning section
13: Training section
20A: Storage section
30A: Communication section
40A: Input-output section
50C: Display section
C1: Processor
C2: Memory
M1: Estimation model
S1, S1A: Classification method

What is claimed is:

1. A classification apparatus comprising
at least one processor carrying out:
an acquiring process of acquiring series data; and
a class label assigning process of assigning a class label to each piece of element data contained in the series data, by repeatedly applying quickest change detection to the series data,
in the class label assigning process, the at least one processor
sequentially calculates a statistic obtained by referring to each piece of element data contained in the series data and compares the statistic calculated to a threshold, to determine a class transition, and
each time the statistic reaches the threshold,
performs:
initialization of the statistic; and
redefinition of an initial distribution of a density function used for calculating the statistic.

2. The classification apparatus according to claim 1, wherein
in the class label assigning process, the at least one processor
uses the following cumulative density function ratio:

$$\Omega_\ell^{(i)}[k] = \max\{\Omega_\ell^{(i)}[k-1], \Omega_\ell^{(i-1)}[k-1]\} + \log\frac{f_\ell^{(i)}(\Delta\hat{\theta}[k])}{f_0(\Delta\hat{\theta}[k])}$$

$$\Omega_\ell^{(0)}[k] := \log\frac{f_\ell^{(0)}(\Delta\hat{\theta}[k])}{f_0(\Delta\hat{\theta}[k])}$$

which is expressed with use of
an index i (i=0, 1, . . . , T) for identifying a transition phase,
an index k which indicates ordering of element data $\Delta\hat{\theta}[k]$,
a class label l (l=0, 1, . . . , or L),
a density function $f^{(i)}_\ell(\Delta\hat{\theta}[k])$, and
an initial distribution $f_0(\Delta\hat{\theta}[k])$ of a density function,
and refers to a statistic $W^D_\ell[k]$ expressed as $$W_\ell^D[k] = \max\{\Omega_\ell^{(0)}[k], \ldots, \Omega_\ell^{(T)}[k], 0\}$$

to determine the class transition.

3. The classification apparatus according to claim 1, wherein
in the class label assigning process, the at least one processor
uses, as the density function for calculating the statistic, a density function estimated by an estimation model trained in advance.

4. The classification apparatus according to claim 3, wherein
in the acquiring process, the at least one processor acquires labeled training data which contains series data and a ground truth label assigned to each piece of element data contained in the series data, and
the at least one processor further carries out
a training process of training the estimation model by referring to the labeled training data.

5. The classification apparatus according to claim 1, wherein
the series data is time-series data having temporal sequentiality.

6. The classification apparatus according to claim 1, wherein the at least one processor further carries out
a display process of displaying the class label assigned by the class label assigning means, together with at least some pieces of element data contained in the series data.

7. A classification method performed by at least one processor and comprising:
an acquiring process of acquiring series data; and
a class label assigning process of assigning a class label to each piece of element data contained in the series data, by repeatedly applying quickest change detection to the series data,
in the class label assigning process, the at least one processor
sequentially calculates a statistic obtained by referring to each piece of element data contained in the series data and compares the statistic calculated to a threshold, to determine a class transition, and
each time the statistic reaches the threshold, performs:
initialization of the statistic; and
redefinition of an initial distribution of a density function used for calculating the statistic.

8. A computer-readable, non-transitory recording medium having recorded thereon a program for causing at least one processor to function as a classification apparatus, the program causing the at least one processor to carry out:
a process of acquiring series data; and
a process of assigning a class label to each piece of element data contained in the series data, by repeatedly applying quickest change detection to the series data,
in the class label assigning process, the at least one processor
sequentially calculates a statistic obtained by referring to each piece of element data contained in the series data and compares the statistic calculated to a threshold, to determine a class transition, and
each time the statistic reaches the threshold, performs:
initialization of the statistic; and
redefinition of an initial distribution of a density function used for calculating the statistic.

9. The classification method according to claim 7, wherein
in the class label assigning process, the at least one processor
uses the following cumulative density function ratio:

$$\Omega_\ell^{(i)}[k] = \max\{\Omega_\ell^{(i)}[k-1], \Omega_\ell^{(i-1)}[k-1]\} + \log\frac{f_\ell^{(i)}(\Delta\hat{\theta}[k])}{f_0(\Delta\hat{\theta}[k])}$$

$$\Omega_\ell^{(0)}[k] := \log\frac{f_\ell^{(0)}(\Delta\hat{\theta}[k])}{f_0(\Delta\hat{\theta}[k])}$$

which is expressed with use of
an index i (i=0, 1, . . . , T) for identifying a transition phase,
an index k which indicates ordering of element data $\Delta\hat{\theta}[k]$,
a class label l (l=0, 1, . . . , or L),
a density function $f^{(i)}_\ell(\Delta\hat{\theta}[k])$, and
an initial distribution $f_0(\Delta\hat{\theta}[k])$ of a density function,
and refers to a statistic $W^D_\ell[k]$ expressed as $$W_\ell^D[k] = \max\{\Omega_\ell^{(0)}[k], \ldots, \Omega_\ell^{(T)}[k], 0\}$$

to determine the class transition.

10. The classification method according to claim 7, wherein
in the class label assigning process, the at least one processor
uses, as the density function for calculating the statistic, a density function estimated by an estimation model trained in advance.

11. The classification method according to claim 10, wherein
in the acquiring process, the at least one processor acquires labeled training data which contains series data and a ground truth label assigned to each piece of element data contained in the series data, and
the at least one processor further carries out
a training process of training the estimation model by referring to the labeled training data.

12. The classification method according to claim 7, wherein
the series data is time-series data having temporal sequentiality.

13. The classification method according to claim 7, wherein the at least one processor further carries out
a display process of displaying the class label assigned by the class label assigning means, together with at least some pieces of element data contained in the series data.

14. The computer-readable, non-transitory recording medium according to claim 8, wherein
in the class label assigning process, the at least one processor
uses the following cumulative density function ratio:

$$\Omega_\ell^{(i)}[k] = \max\{\Omega_\ell^{(i)}[k-1], \Omega_\ell^{(i-1)}[k-1]\} + \log\frac{f_\ell^{(i)}(\Delta\hat{\theta}[k])}{f_0(\Delta\hat{\theta}[k])}$$

-continued $$\Omega_\ell^{(i)}[k] := \log\frac{f_\ell^{(i)}(\Delta\hat{\theta}[k])}{f_0(\Delta\hat{\theta}[k])}$$

which is expressed with use of
an index i (i=0, 1, . . . , T) for identifying a transition phase,
an index k which indicates ordering of element data $\Delta\hat{\theta}[k]$,
a class label l (l=0, 1, . . . , or L),
a density function $f_\ell^{(i)}(\Delta\hat{\theta}[k])$, and
an initial distribution $f_0(\Delta\hat{\theta}[k])$ of a density function,
and refers to a statistic $W^D_\ell[k]$ expressed as $$W_\ell^D[k] = \max\{\Omega_\ell^{(0)}[k], \dots, \Omega_\ell^{(T)}[k], 0\}$$

to determine the class transition.

15. The computer-readable, non-transitory recording medium according to claim 8, wherein
in the class label assigning process, the at least one processor
uses, as the density function for calculating the statistic, a density function estimated by an estimation model trained in advance.

16. The computer-readable, non-transitory recording medium according to claim 15, wherein
in the acquiring process, the at least one processor acquires labeled training data which contains series data and a ground truth label assigned to each piece of element data contained in the series data, and
the at least one processor further carries out
a training process of training the estimation model by referring to the labeled training data.

17. The computer-readable, non-transitory recording medium according to claim 8, wherein
the series data is time-series data having temporal sequentiality.

18. The computer-readable, non-transitory recording medium according to claim 8, wherein the at least one processor further carries out
a display process of displaying the class label assigned by the class label assigning means, together with at least some pieces of element data contained in the series data.

* * * * *